(12) United States Patent
Gomaa et al.

(10) Patent No.: US 12,163,100 B2
(45) Date of Patent: Dec. 10, 2024

(54) PLASMA-ASSISTED METHOD AND SYSTEM FOR TREATING RAW SYNGAS COMPRISING TARS

(71) Applicant: PLASCO CONVERSION TECHNOLOGIES INC., Ottawa (CA)

(72) Inventors: Islam Gomaa, Nepean (CA); Andreas Tsangaris, Ottawa (CA); Graeme Hay, Kanata (CA); Marc Bacon, Stittsville (CA)

(73) Assignee: OMNI Conversion Technologies Inc., Ottawa (CA)

( * ) Notice: Subject to any disclaimer, the term of this patent is extended or adjusted under 35 U.S.C. 154(b) by 931 days.

(21) Appl. No.: 17/141,079

(22) Filed: Jan. 4, 2021

(65) Prior Publication Data
US 2021/0198588 A1 Jul. 1, 2021

Related U.S. Application Data

(62) Division of application No. 15/543,768, filed as application No. PCT/CA2016/050027 on Jan. 13, 2016, now Pat. No. 10,883,059.
(Continued)

(51) Int. Cl.
*C10K 1/34* (2006.01)
*B01J 19/08* (2006.01)
(Continued)

(52) U.S. Cl.
CPC .............. *C10K 1/34* (2013.01); *B01J 19/088* (2013.01); *C01B 3/342* (2013.01); *C10G 9/36* (2013.01);
(Continued)

(58) Field of Classification Search
CPC .......... C10K 1/34; C10K 3/008; C10K 1/026; C10K 3/001; C10K 1/02; B01J 19/088;
(Continued)

(56) References Cited

U.S. PATENT DOCUMENTS

2005/0250862 A1* 11/2005 Bayle ...................... C10G 2/32
518/702
2007/0266633 A1* 11/2007 Tsangaris ............... C10K 3/006
48/197 R
(Continued)

*Primary Examiner* — Xiuyu Tai
(74) *Attorney, Agent, or Firm* — Perkins Coie LLP

(57) ABSTRACT

This disclosure provides a system and method for conversion of raw syngas and tars into refined syngas, while optionally minimizing the parasitic losses of the process and maximizing the usable energy density of the product syngas. The system includes a reactor including a refining chamber for refining syngas comprising one or more inlets configured to promote at least two flow zones: a central zone where syngas and air/process additives flow in a swirling pattern for mixing and combustion in the high temperature central zone; at least one peripheral zone within the reactor which forms a boundary layer of a buffering flow along the reactor walls, (b) plasma torches that inject plasma into the central zone, and (c) air injection patterns that create a recirculation zone to promotes mixing between the high temperature products at the core reaction zone of the vessel and the buffering layer, wherein in the central zone, syngas and air/process additives mixture are ignited in close proximity to the plasma arc, coming into contact with each other, concurrently, at the entrance to the reaction chamber and method of using the system.

8 Claims, 13 Drawing Sheets

Related U.S. Application Data

(60) Provisional application No. 62/103,114, filed on Jan. 14, 2015.

(51) Int. Cl.
    *C01B 3/34*     (2006.01)
    *C10G 9/36*     (2006.01)
    *C10K 3/00*     (2006.01)

(52) U.S. Cl.
CPC ....... *C10K 3/008* (2013.01); *B01J 2219/0805* (2013.01); *B01J 2219/0894* (2013.01); *C01B 2203/0216* (2013.01); *C01B 2203/0222* (2013.01); *C01B 2203/0255* (2013.01); *C01B 2203/0861* (2013.01); *C01B 2203/1247* (2013.01); *Y02P 20/129* (2015.11)

(58) Field of Classification Search
CPC ....... B01J 2219/0805; B01J 2219/0894; C01B 3/342; C01B 2203/0216; C01B 2203/0222; C01B 2203/0255; C01B 2203/0861; C01B 2203/1247; C10G 9/36; C10G 9/30; Y02P 20/129; F23G 5/085; F23G 2201/304; F23G 2204/201; F23G 2206/10; F23G 2201/701; F23G 2201/301; F23G 2900/50204; F23G 2202/104; F23G 5/0276; F23G 5/46; F23G 5/50; C10J 2300/1238; C10J 2300/1634; C10J 3/30; C10J 3/18; C10J 3/84; C10J 3/00; C10J 2200/09; C10J 2300/1618; C10J 2300/0956; C10J 2300/1869; C10J 2300/0946; C10J 2200/15; C10J 2300/1884; C10J 3/34; F23J 2217/40; Y02E 20/12

See application file for complete search history.

(56) References Cited

U.S. PATENT DOCUMENTS

| | | | |
|---|---|---|---|
| 2011/0036014 A1* | 2/2011 | Tsangaris | C10J 3/721 48/197 FM |
| 2012/0070347 A1* | 3/2012 | Bacon | F23G 5/085 422/186.04 |

* cited by examiner

PLASMA-ASSISTED METHOD AND SYSTEM FOR TREATING RAW SYNGAS COMPRISING TARS

CROSS-REFERENCE TO RELATED APPLICATION

This application is a divisional application of U.S. application Ser. No. 15/543,768, entitled "PLASMA-ASSISTED METHOD AND SYSTEM FOR TREATING RAW SYNGAS COMPRISING TARS", which was filed Jul. 14, 2017, which is a national stage entry of PCT/CA2016/050027, entitled "PLASMA-ASSISTED METHOD AND SYSTEM FOR TREATING RAW SYNGAS COMPRISING TARS", which was filed Jan. 13, 2016, which claims the benefits and priority of U.S. Provisional Patent Application No. 62/103,114, entitled "PLASMA-ASSISTED METHOD AND SYSTEM FOR TREATING RAW SYNGAS COMPRISING TARS", which filed Jan. 14, 2015. The entire contents of the aforementioned patent documents are incorporated by reference as part of the disclosure of this application.

TECHNICAL FIELD

This invention pertains to the field of syngas treatment. In particular, it relates to a plasma assisted method and system for treating raw syngas comprising tar.

BACKGROUND

Gasification is a process that enables the conversion of carbonaceous feedstock, such as municipal solid waste (MSW) or biomass into a combustible gas. The product gas of the gasification of MSW often includes a significant amount of tar.

Prior to use, the product gas from gasification is often refined. Refinement systems include those that expose the product gas to plasma. Plasma refinement reduces the larger hydrocarbon molecules in the product gas to a combination of hydrogen, carbon monoxide, carbon dioxide and steam, with some trace contaminants, through the processes of thermal decomposition and plasma catalysis. The hydrogen and carbon monoxide mixture, known as synthesis gas (syngas) can be combusted in an internal combustion engine generator(s), which converts the chemical energy of the syngas into electrical energy. A steam turbine generator uses the by-product heat from combustion to produce additional electricity.

An efficient and reliable process of producing refined syngas can significantly impact the economics of waste or biomass plants. Improvements in the refinement process and related mechanisms are an ongoing effort at many research facilities, in light of current interest in renewable energy, waste management and hydrogen/syngas fuels.

Companies like Advanced Plasma Power (APP), for example, have developed a two-stage thermal Gasplasma™ process to produce refined syngas, which can be fed directly into a gas engine for the efficient recovery of energy. In this process, the plasma treatment step is for both off-gas and solid residue in a single chamber and the issue with having one unit for gas and inert treatment is in the lack of separate control of the gas/inerts treatment.

Hadidi et al. in "Plasma Catalytic Reforming of Biofuels", Dec. 17, 2003, discloses fuel reforming experiments from partial oxidation of biofuels, in which a calculated amount of oxygen is added in the reactor, in order to capture each carbon atom in the fuel as carbon monoxide, thus releasing hydrogen as hydrogen molecules. The production of plasma, by using a plasmatron reforming technology, allows for a robust and large volume reaction initiation of the fuel-air mixture. The work describes the procedure, results and analysis of bio-fuels reformation using low-current plasma discharges. Hadidi also discusses the possibility of limiting the air supply to the reactor, to control the reaction kinetics and subsequently the composition of their effluent. In addition, Hadidi describes the use of a boundary layer of air to protect the walls of the reactor from high temperatures that are present in the core reaction zone of the reactor.

In the Hadidi process, fuel passes through a thermal plasma torch, which has three air inlets and the end result is that everything is converted to plasma; mixing is only a side note to ensure having a stable plasma field.

In some prior art systems, poor mixing of the air and syngas components results in stratification of the reactant mixture within the reactor body, thus forming dynamic regions in the reactor that are fuel-rich, fuel-lean or stoichiometric. This creates a challenge from an engineering standpoint, because it does not allow the use of a specific, static strategy for igniting the air-fuel mixture, as the mixture mole fractions are constantly evolving. Subsequently, it results in an unstable flame in the reactor, leading to inconsistent temperatures profiles and poor tar conversion.

These aforementioned challenges reduce the tar conversion efficiency of the refining chamber.

Although effective at reducing tar contamination, plasma, a high temperature medium consisting of highly reactive species, may undesirably cause corrosion of the reactor walls.

This background information is provided for the purpose of making known information believed by the applicant to be of possible relevance to the present invention. No admission is necessarily intended, nor should be construed, that any of the preceding information constitutes prior art against the present invention.

SUMMARY

An object of the present invention is to provide plasma-assisted method and system for treating of raw syngas comprising tars. In accordance with an aspect of the invention, there is provided a plasma-assisted system for treating raw syngas comprising tars, comprising: (a) a refining chamber for refining syngas comprising one or more inlets configured to promote at least two flow zones: a core reaction zone where syngas and air/process additives flow in a swirling pattern for mixing and combustion in the high temperature central syngas flow zone; at least one peripheral zone within the reactor which forms a boundary layer of a buffering flow along the reactor walls, (b) one or more plasma torches that inject plasma into the core reaction zone, and (c) air injection patterns that create a recirculation zone to promote mixing between the high temperature products at the core reaction zone of the vessel and the buffering layer; wherein in the core reaction zone, syngas and air/process additives mixture are ignited in close proximity to the plasma arc, coming into contact with each other, concurrently, at the entrance to the reaction chamber.

BRIEF DESCRIPTION OF THE DRAWINGS

Embodiments of the invention will now be described, by way of example only, by reference to the attached figures, wherein:

FIG. 2 also shows the low temperature zones 305, hot zones 312, the core reaction zone/mixing zone 304 and the reaction chamber outer wall 303, the reactor inlet wall 307 and the location of the plasma torch(es) 308. The concentrated plasma 312 is also shown in FIG. 2. The chamber also comprises a frustum-shaped portion. The recirculation path 315 of gases is caused by the differential in temperatures, pressures and velocities of the central region 304 and the boundary regions 305.

FIGS. 5A-5B illustrates a top view and side view of one embodiment, showing a multitude of air entrance ports 301, located tangentially to the refinement chamber. The reactor inlet wall 307 is also shown in the figure. Chamber 303 and plasma torch arrangement are the same as depicted in FIG. 2.

FIG. 6A-6B also shows the hot region zone(s) 312 and the cold region zone(s) 313 at two different cross-sections locations in the reactor. The location of FIG. 6A is upstream of the location of FIG. 6B.

DETAILED DESCRIPTION

Definitions

Figure 1:
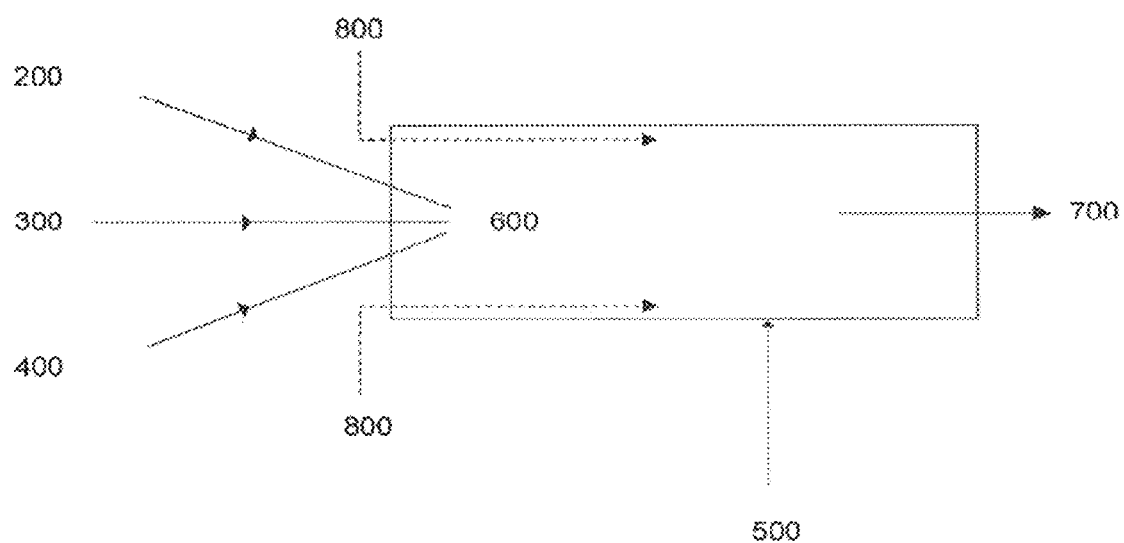
FIG. 1 illustrates one embodiment of the system detailing raw syngas input 200 and injection of raw syngas along the internal periphery 800 of the reactor chamber 500, the process air/additive input 300, plasma application 400 and mixing zone 600, and the processed syngas output 700.

Unless defined otherwise, all technical and scientific terms used herein have the same meaning as commonly understood by one of ordinary skill in the art to which this invention belongs.

As used herein, the term "raw syngas" means, generally, a gas generated during the gasification process that has not been treated.

As used herein, the term "tar" means high molecular weight hydrocarbons which are generally defined as the downstream condensable hydrocarbon component in the product gas.

The term "process additives" as used herein, includes any compound that can facilitate the partial oxidation of syngas and includes air, $O_2$, enriched air, steam, $CO_2$, $O_3$, $H_2O_2$, $H_2S$ and combinations thereof.

Overview

This invention provides a system and method for treating raw syngas comprising tar. The system comprises a refining chamber comprising one or more inlets for raw syngas configured to provide at least two flow zones including a central zone where syngas and air/process additives flow in a swirling pattern for mixing and combustion; and at least one peripheral zone that forms a boundary layer of a buffering flow along the reactor walls. The system further includes one or more plasma torches that inject plasma into the central zone. The system is further configured, such that flow patterns are created in a recirculation zone to promote mixing between the high temperature products at the core reaction zone and the buffering layer to facilitate complete processing. The system is configured such that in the central zone, syngas and air/process additives mixture is ignited in close proximity to the plasma arc.

The invention further provides a method for treatment of raw syngas including tars that comprises mixing the syngas and air/process additives in a central syngas flow zone, in a swirling pattern for combustion, with the simultaneous injection of plasma-generated radicals, electrons and ions into this central syngas flow zone; recirculating a peripheral syngas stream into the core reaction zone/mixing zone created by the combustion of the centrally injected syngas with process air/additives, with the simultaneous injection of plasma-generated radicals, electrons and ions into said central syngas flow zone; creating a stable flame in a reactor comprising a rich fuel:air ratio, to facilitate the plasma catalysis of the raw syngas and the breakdown of tars into lower hydrocarbons and igniting the near-stoichiometric or oxidising mixture in the central zone, where the syngas, process additives and plasma come into contact with each other.

In some embodiments, the method and/or system are configured to maximize tar conversion and energy density of the product syngas while optionally minimizing parasitic power consumption and/or maintenance down-time.

The system is configured to create various zones within the reaction chamber including a zone configured to optimize the conversion of tar by exposure to plasma and at least one zone(s) to shield the reactor walls from being exposed to the high temperature plasma at the reactors' core reaction zone and the reacting species that causes corrosion to the reactor walls.

In some embodiments, this multi-zone system is configured to allow for reactor walls that withstand lower operating temperatures of plasma (+800° C.).

In the present invention, preheated-air/syngas/plasma are mixed to accomplish multiple objectives; which include allowing part of the raw syngas to be oxidized, thus providing heat to facilitate refining the rest of the raw syngas. Another objective accomplished by this gas feeding method is to create a recirculation zone that eventually combines with the buffering layer into the core reaction zone of the reactor for gas reformulation, once it has served its purpose of buffering the reactor walls adjacent to the high temperature core reaction zone of the reactor. Plasma is added to the syngas in such a way that it reforms the syngas that wasn't completely oxidized; it also helps maintain the flame in the center of the reactor, where the reaction mechanisms shift from oxidizing to reducing.

In some embodiments, the mixture of air and syngas in the refinement chamber is made sub-stoichiometric to maximize tar conversion reactions, while minimizing the use of syngas as heating fuel.

Temperatures of +800° C. are required to breakdown some of the heavier tar molecules into the desired gaseous lower molecular weight hydrocarbons. The elevated temperatures in the refinement chamber can be achieved by a balanced combination of the two following methods:

1. Pre-heating the air being fed into the refinement chamber.
    The advantage of this method is that waste heat from a downstream process is recycled by pre-heating the air, thereby reducing the requirement for an external energy source or the requirement for further consumption of hydrogen and CO. This helps maximize the overall energy efficiency of process. The disadvantage of using air is that, thermal energy from combustion of air and syngas, used to increase the syngas temperature, is now used to raise the air temperature which is mainly nitrogen, an inert in the refining process. This extra combustion would result in less heating value from the resulting refined syngas and would reduce the efficiency of the process. The nitrogen present in the air has an added disadvantage of also diluting the syngas in the reaction chamber and consequently further reduces the lower heating value (LHV) of the refined syngas. A reduced LHV of the syngas is undesirable.
2. Using the plasma torches in the refinement chamber to inject hot, reactive, plasma gases into the reactant mixture.
    The main advantage of the plasma torch is the highly reactive radicals and electrons it produces, which in combination with the combustion-generated ions provide for an effective tar conversion system. Going beyond the use of the plasma as a reaction catalyst, its use as a heat source has the main disadvantage of requiring an external power source i.e., it consumes electricity, which increases the parasitic power losses within the process-reducing the electrical efficiency of the process. The advantage of this method is that it does not dilute the syngas-air reactant mixture.

Methods 1, 2 or a combination of methods 1 and 2 in the operation of a refinement chamber, are utilized to achieve an optimal balance for providing thermal energy to the reactants.

The design parameters of the refinement system can be adjusted to achieve desired outcomes (tar conversion or similar objective) for any specific process volumetric flow, component concentration in the feedstock, process temperature, feedstock residence time or other process parameters. The key design parameters that can be adjusted are:

1. Ratio of the major and minor fuel (raw syngas) stream split being fed into the reactor. The minor stream (central) can be from 5% to 50% of the main, raw syngas feed stream with the balance being the major stream (peripheral).
2. The amount and temperature of air fed into the system can range from 40% to 100% of the volume of the raw syngas entering the system at a temperature ranging from ambient to 800° C.
3. Location, position, power and type of the plasma torches.

The ratio of the flow stream split being fed into the reactor determines the size and location of the boundary layer and allows accommodation of raw syngas with different lower heating values (LHV). The amount and temperature of air fed into the system allows control of the oxidation potential of the reactor and allows accommodation of various process conditions and feedstock compositions. The location, position and power of the plasma torches help in defining the shape and location of the plasma regime within the reactor. For majority of process conditions, the location of the torch(es) will be such that the high energy plasma zone coincides with the oxidation zone in order to take advantage of the synergies of the two phenomena.

The three aforementioned parameters can be optimized for a wide range of process conditions with feedstock of various compositions to achieve:

A distinct lower temperature boundary layer that protects exposure of the walls of the reactor from the high temperatures that exist in the core reaction zone of the reactor.

A plasma gasification reactor that can self-sustain a stable flame in its core reaction zone, even though the average air-fuel mixture ratio is not stoichiometric.

An economical refinement chamber that maximizes the LHV and overall usable energy flux of the process raw syngas.

Detailed Description

FIG. 1 illustrates a general diagram of one embodiment of a refinement system showing the raw syngas input 200 and the raw syngas injected along the internal periphery of the reactor chamber 800, the process air/additive input 300, the plasma application 400 and the raw syngas, air and plasma mixing zone 600, the reactor body 500 and the processed syngas product 700.

In accordance with this embodiment, the reactor for refining syngas comprises one or more inlets configured to promote at least two flow zones including a central zone and a peripheral zone, within the reactor. The flow zones can be accomplished by the shape and geometry of inlet; for example a split of inlet flow into two equal sub-streams can be accomplished by the inlet being internally divided into two sections of equal cross-sectional areas. In the central zone, a near-stoichiometric or oxidising mixture of syngas and air/process additives flows in a swirling pattern as a flame stabilization strategy; in the peripheral zone, a boundary layer of syngas provides a buffering flow along the reactor walls protecting the reactor wall from being exposed to temperatures approaching its melting point and reacting species that causes corrosion to the reactor walls. This boundary protection layer is important from a thermal and subsequently from an economic standpoint, because it dictates the decision on the type of material that is used to construct/line the walls/body of the reactor. A reactor that is designed for a higher temperature will cost significantly more than one designed for a lower operating temperature due to the cost difference in the materials used in its construction. The reactor is designed such that the fluid dynamics therein, promote eventual migration of the gases which once formed the boundary layer into the central zone—this is achieved by the pressure differential between the central zone and the boundary layer achieved in turn by velocity differences between the regions. Fresh raw syngas now forms a new buffering layer, while the previous buffering layer moves to the core reaction zone of the reactor and is exposed to the tar conversion process before exiting the reactor. The location of plasma injection is optimized, so plasma gets entrained in the recirculating mixture, thereby facilitating the desired conversion reaction therein and maximizing the conversion efficiency of the reactor.

The number of flow zones within the reactor is related to the number of distinct temperature zones within the reactor, which can be two or more for any given design.

The near-stoichiometric or oxidising mixture is ignited in the central zone (mixing region), where the syngas, air and plasma come into contact with each other, concurrently, at the entrance to the reaction chamber. This mixing region allows the achievement of a stable flame and consistent temperatures in a reactor comprising an overall rich fuel:air ratio, thereby facilitating predictable plasma catalysis of the raw syngas and the breakdown of tars into lower hydrocarbons, hydrogen and carbon monoxide. The percent composition of tars in the product of the process is of the utmost consideration, which qualifies a waste-to-energy process for certain applications while excluding it from others. Another function of the zones in the reactor are to protect the internal walls of the reactor from the high temperatures (+800° C.) at the core reaction zone of the reactor and the reacting species that causes corrosion to the reactor walls, by limiting the availability of air/oxygen at the boundary region, directing it to the core reaction zone of the reactor, resulting in lower temperatures at the buffering layers.

The present invention can be implemented in various reactor geometries, each of which can be optimized to specific process conditions and objectives i.e., the process conditions dictate the optimum reactor geometry for a given set of outcomes.

Figure 2:
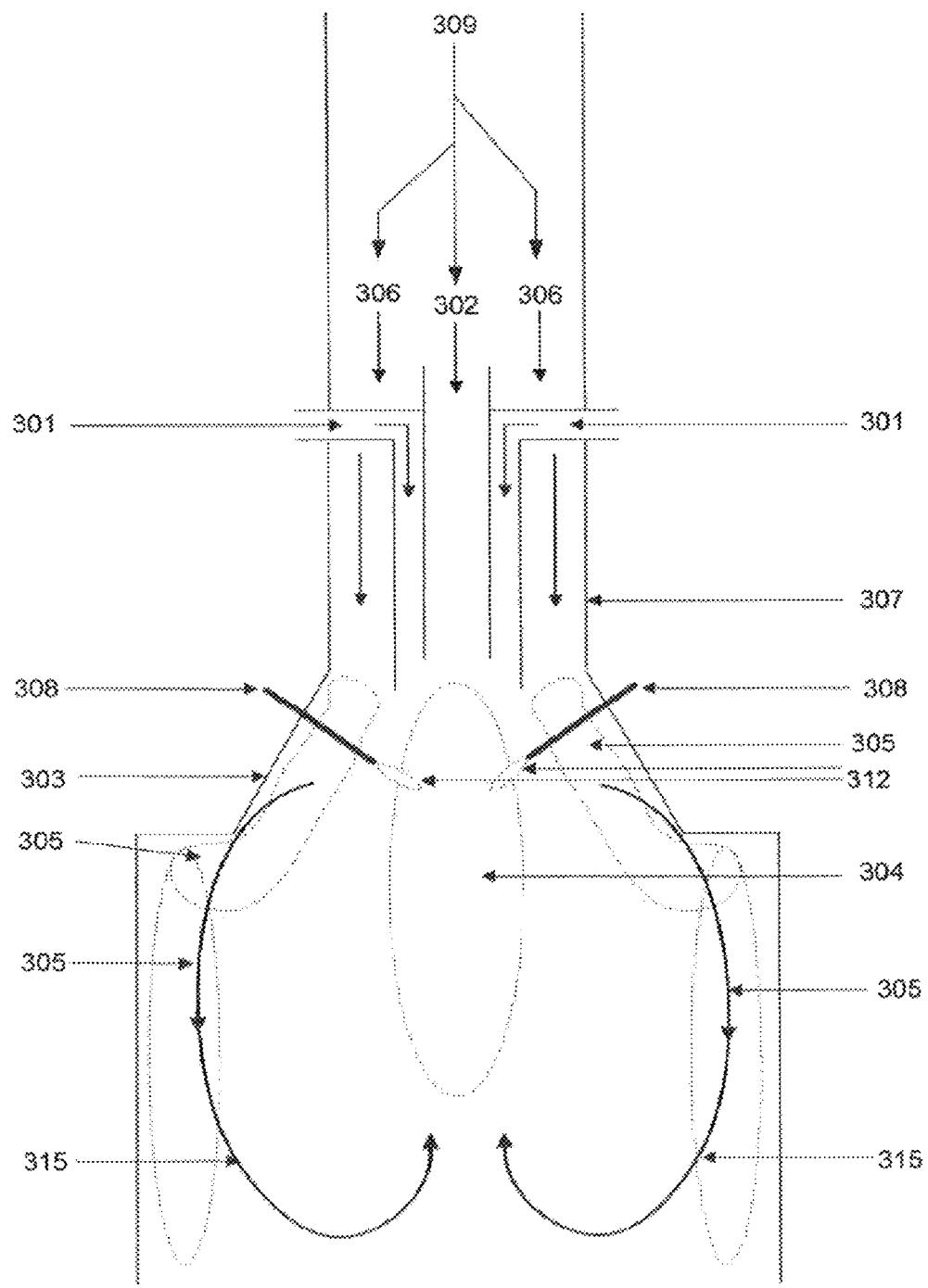
FIG. 2 illustrates a side view of one embodiment of the system configured, such that the inlet splits the raw syngas feed 309 into two volumetric flows: 302 (central syngas flow zone) and 306 (peripheral syngas flow zone), and feeds the syngas into the reaction chamber, while the process air is routed through air entrance ports 301 that are perpendicular to the chamber and tangential to the main flow.

In the embodiment shown in FIG. 2, the minor stream is routed through the central syngas flow zone 302 in direction to a core reaction zone/mixing zone 304, while the major stream of the syngas flow is introduced along the perimeter of the chamber which forms the peripheral syngas flow zone 306. The central syngas flow zone 302 is combined with the incoming process air, fed into process air/additive inlet ports 301 leading to produce a near-stoichiometric or oxidising combustible syngas-air mixture in a core reaction zone/mixing zone 304, in which the mixture is ignited when it arrives in the vicinity of the plasma torch(es) 308. In the peripheral syngas flow zone 306, a boundary layer of syngas in the low temperature zone 305 (exaggerated for clarity, in FIG. 2) provides a buffering flow along the reaction chamber outer wall 303 protecting it from the high temperatures in the core reaction zone/mixing zone 304 and the reacting species that causes corrosion to the reactor walls, before being pulled into the combustion zone further downstream of the plasma torches.

Figure 3:
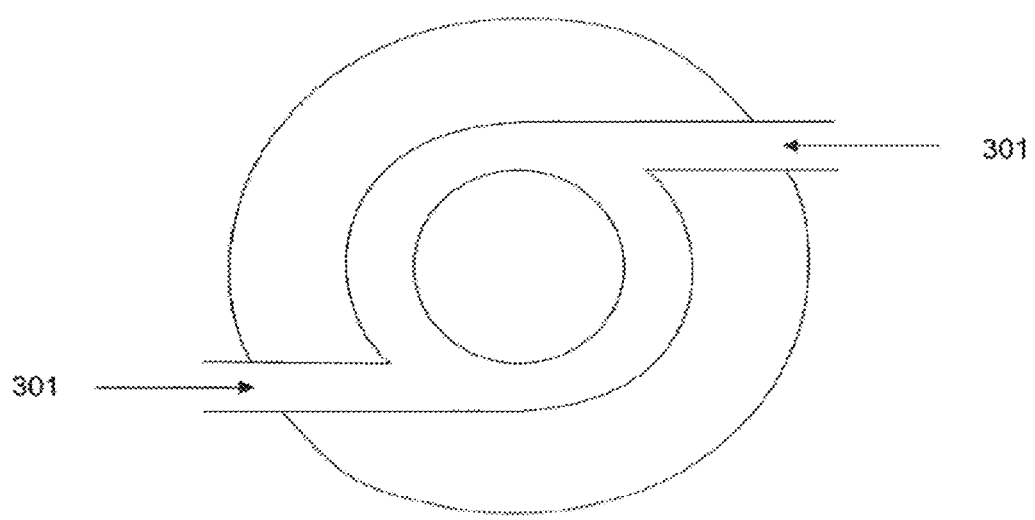
FIG. 3 shows a top view of the area of the refinement chamber where the air entrance ports 301 are located.

In this embodiment, the air introduction is composed of two entry ports 301, located at opposite sides of the reactor (FIG. 3) on a horizontal plane to each other. The pre-heated air streams are introduced tangentially through air inlet ports 301, which create a swirling flow pattern in the air as it enters the reaction chamber.

Figure 4A:
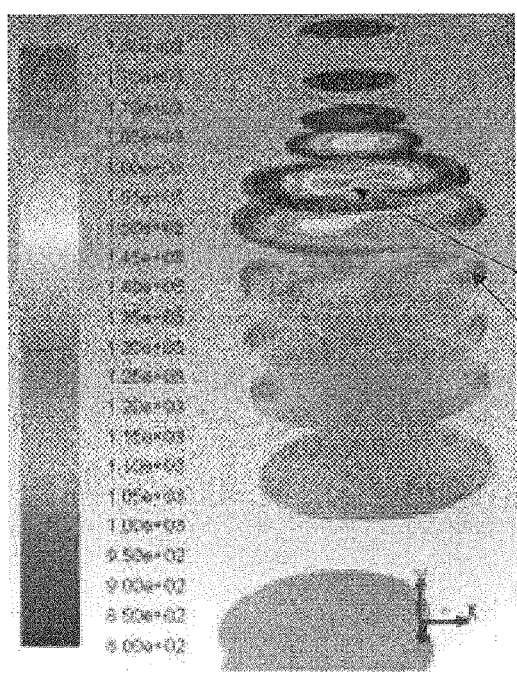
FIG. 4A-4B shows contours of the gas temperatures and streamlines of air flow along with their temperatures for one embodiment of the system. The contours show the core reaction zone/mixing zone 304 and the peripheral syngas flow zone 306 and their differentiation from each other in the reactor.
Figure 4B:
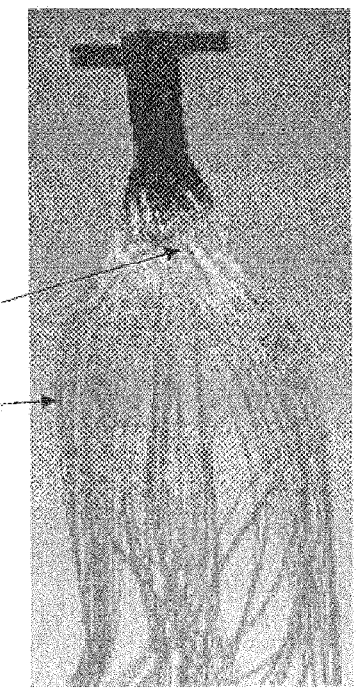

FIGS. 4A and 4B show contours of static temperature within an operational refinement chamber utilizing this design and the splitting of the syngas stream between two zones: central syngas flow zone 302 and peripheral syngas flow zone 306. The swirling motion in the input air stream facilitated by one or more air entrance port(s) 301 creates a core reaction zone/mixing zone 304 within the reactor, in the vicinity of the plasma torches 308, providing a near-stoichiometric or oxidising syngas-air mixture. The result is a stable flame and recirculation in the refinement chamber region and an acceptable tar conversion reaction, minimizing the tar content in the product gases.

Figure 14:
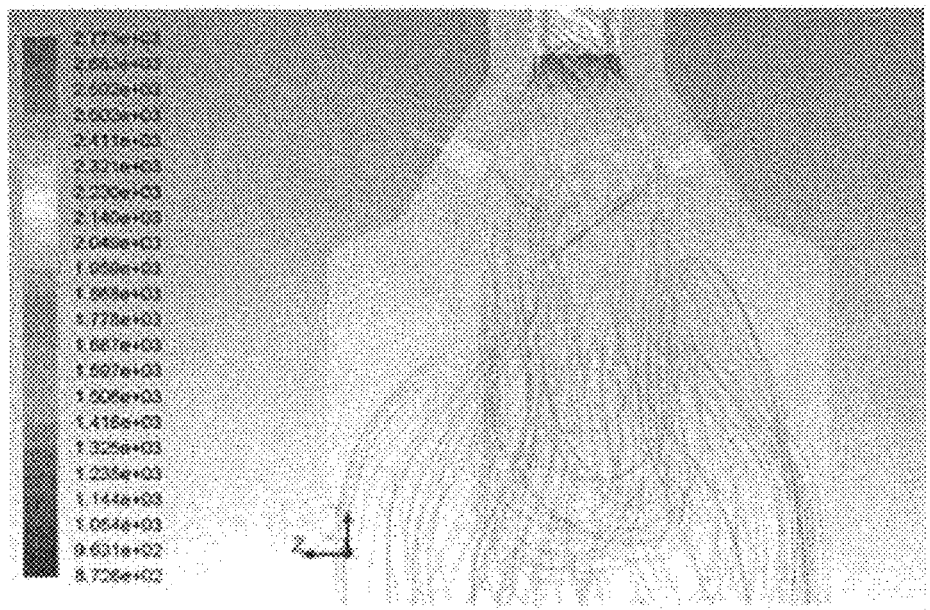
FIG. 14 shows the flow velocities and distribution for a refinement chamber entrance design similar to the one in FIG. 12, but in the presence of a frustum shaped entrance portion. The plasma entrances location in this design is in the frustum shaped portion, protruding past the inner reactor walls.
Figure 15:
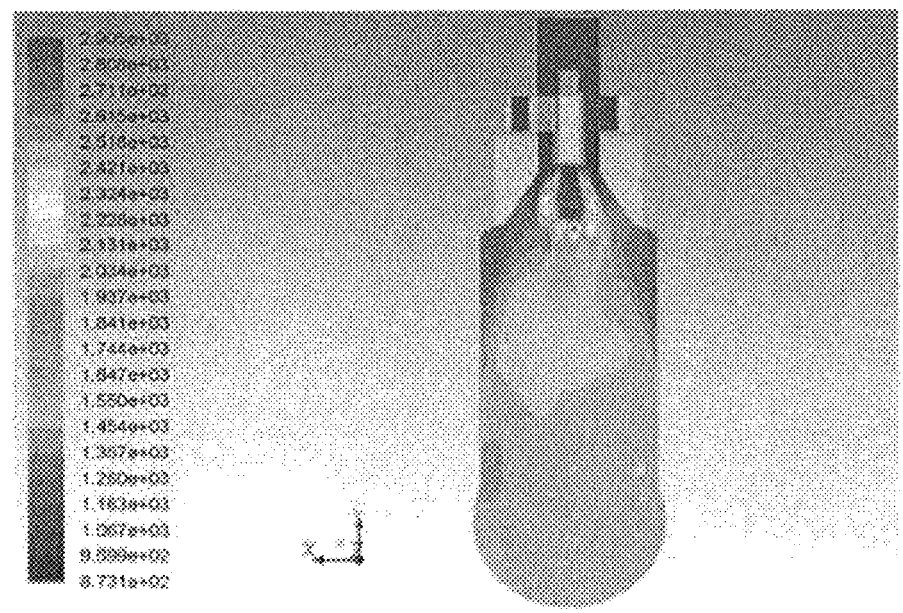
FIG. 15 shows a view of temperature profiles of the design shown in FIG. 7.

This modification of the entrance along with the resulting flow lines is shown in FIG. 14. As shown in the resultant temperature distribution of FIG. 15, the design allows a gradual transition of the reactant fluids from the input into the reactor via a frustum-shaped portion of the reactor thereby providing a uniform temperature profile, a hot plasma region in the core reaction zone of the reactor, reducing erosion of the internal walls of the reactor due to trapped plasma species.

From a thermal analysis standpoint, the temperature profile of the reactors is divided into at least two distinct temperature zones including a core reaction zone and a boundary zone(s). Each of these serves a specific purpose. The core reaction zone can be designed to be the hottest zone in the reactor (FIG. 15) and allows for a stable flame in an otherwise rich fuel:air mixture. This zone is also where the important function of high temperature tar-breakdown occurs. The cooler temperature zone(s) are, in this instance designed to be along the walls of the reactor. The critical function of these zones is to protect the reactor walls from exposure to extreme high temperature (such as those in the core reaction zone of the reactor) and from the reacting species introduced by the plasma that could cause corrosion of the reactor walls. If the wall temperature is kept lower than the core reaction zone temperature, it extends the usable lifetime of the reactor by reducing thermal breakdown of its walls. It also reduces the amount of high temperature resistant (typically ceramic) material applied to the internal walls of the reactor, thereby reducing its cost and process downtime for repair/replacement of the high temperature resistant material. The reactor is designed such that the fluid dynamics therein, promote eventual migration of the gases which once formed the boundary layer, into the central zone. Fresh raw syngas now forms a new buffering layer, while the previous buffering layer moves to the core reaction zone of the reactor and is exposed to the tar conversion process before exiting the reactor. The location of plasma injection is optimized, so plasma gets entrained in the recirculating mixture, thereby facilitating the desired conversion reaction therein and maximizing the conversion efficiency of the reactor.

TABLE 1

Tar conversion performance for actual operation of the embodiment of FIG. 2 is shown below:

| Test # | Total Tar Concentrations (mg Tar/Nm$^3$ of raw syngas) | | Conversion Achieved |
| --- | --- | --- | --- |
| | At Inlet | At Outlet | % |
| 1 | 40,747 mg | 6,897 mg | 83% |
| 2 | 50,191 mg | 3,040 mg | 93% |
| 3 | 57,675 mg | 5,708 mg | 90% |

In an alternative embodiment, the channels for air protruding into the vessel are replaced with a plurality of external, air entrance ports 301 (FIG. 5) allowing a traverse injection of process air into syngas. In an example with 4 air entrance ports 301 (FIG. 5), hot air is injected tangentially into the reactor in a traverse direction to the syngas flow, which creates a swirling flow pattern in the resulting air-syngas mixture, enhancing mixing.

Figure 5A:
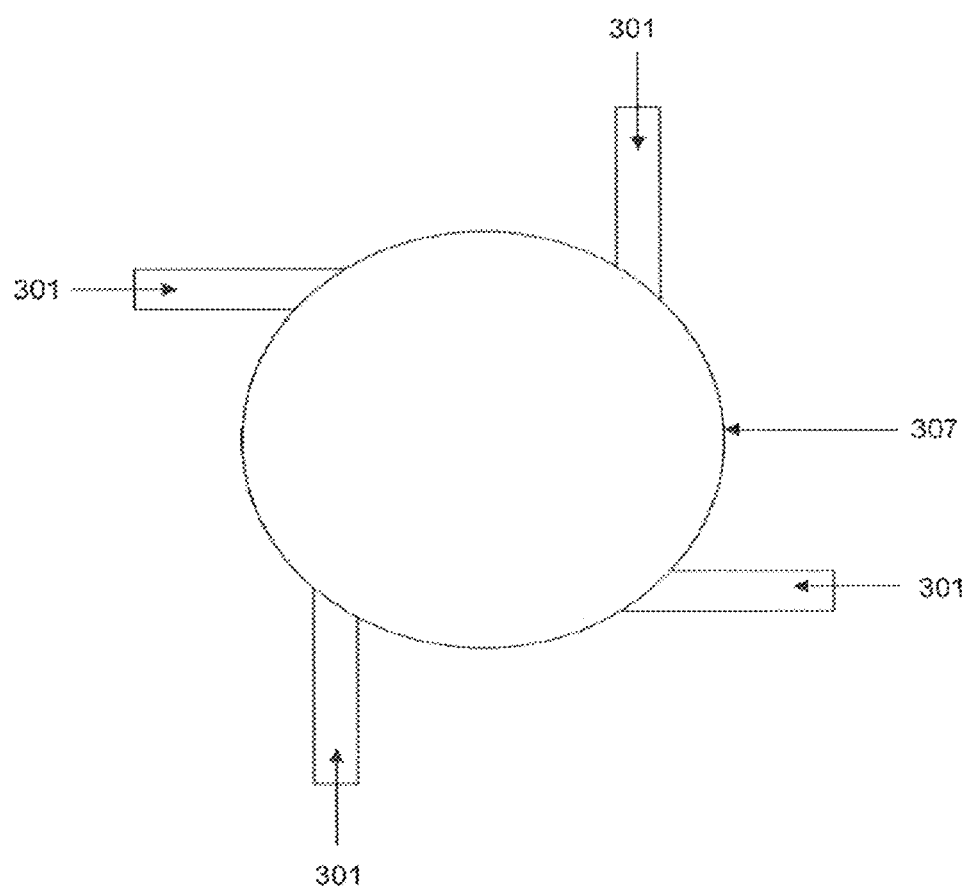
Figure 6B:
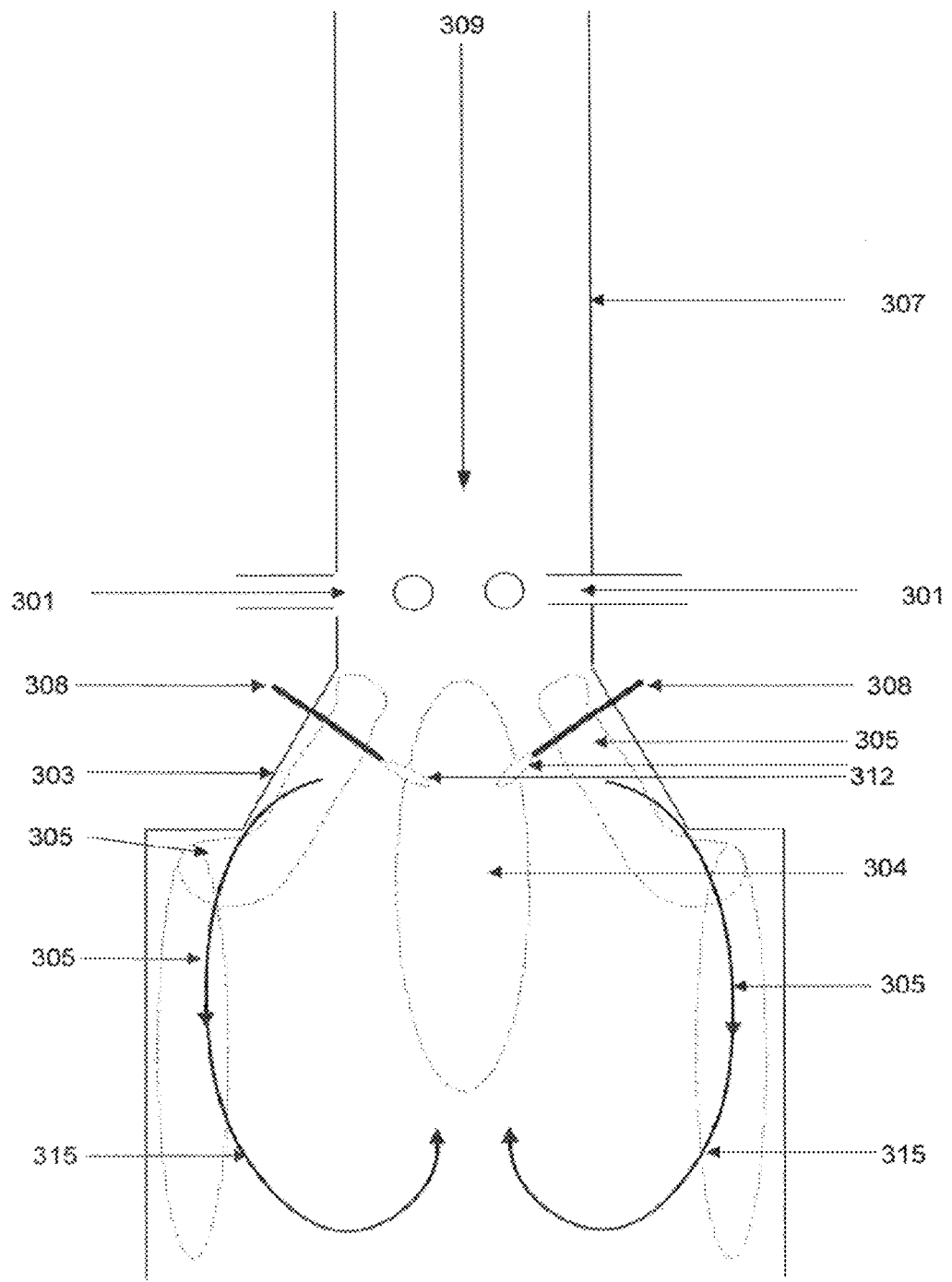
FIGS. 6A-6B show the temperature contours from the top view of the embodiment of FIG. 5. The cross-section is located at the entrance of the reactor.
Figure 6A:
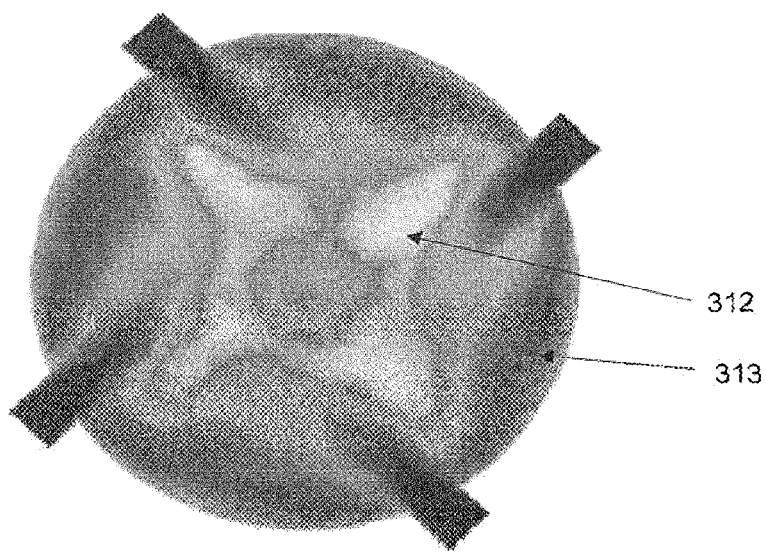
Figure 6B:
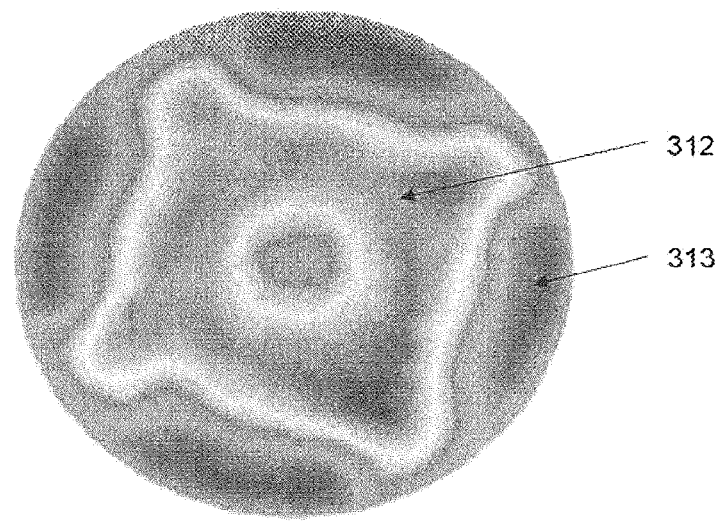
Figure 7A:
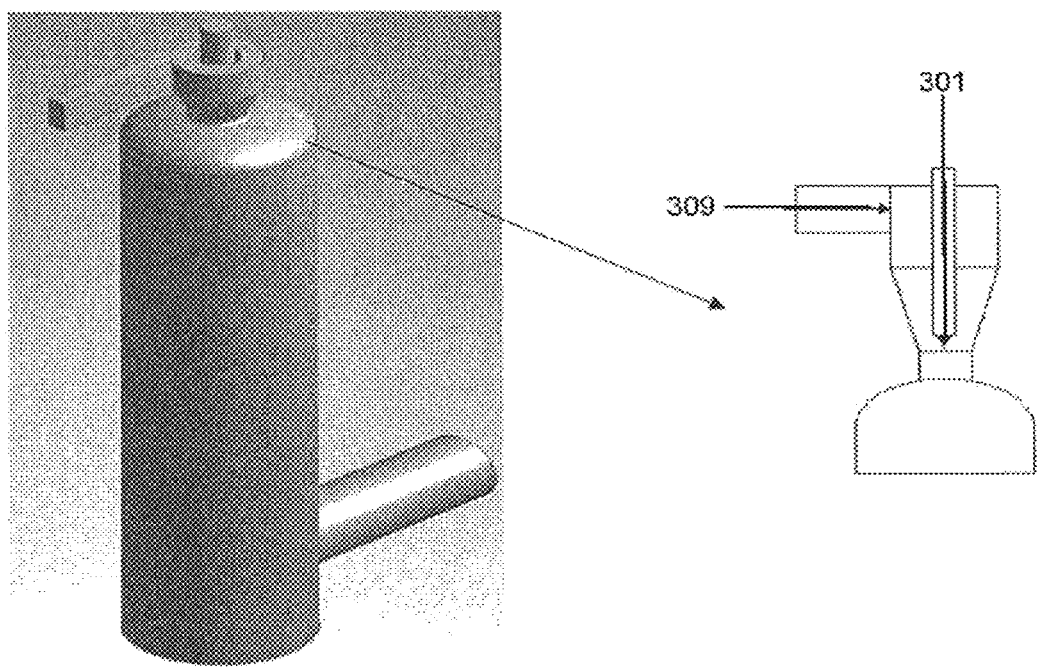
FIGS. 7A and 7B show a lateral view and a top view of a third embodiment of the refinement chamber entrance where the air is injected axially into the vessel through air entrance port 301, while the raw syngas is injected though the tangential syngas entrance port 309.
Figure 7B:
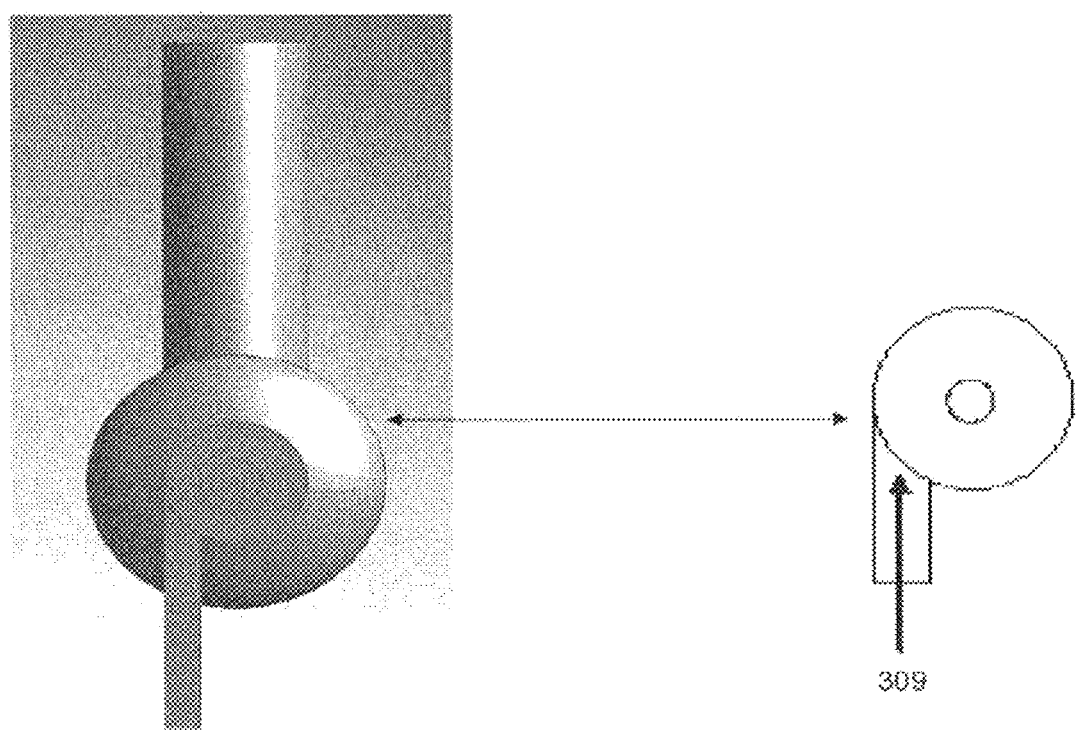

The flame created by the air injection is stabilized by the radicals provided by the flame created from each adjacent air jet (FIG. 5). Torch gases are injected as close as possible to the reaction zone to boost the concentration of radicals and increase heating rate as well as maximize the temperature to facilitate tar conversion. FIGS. 6A and 6B, show examples from Computational Fluid Dynamics (CFD) simulations showing temperature distribution, at the plane of the air injection (FIG. 6A) and at a plane approximately 5-6 inches below (FIG. 6B) the plane of air injection. The location of the plasma entrance (torch location) can be varied during the design of the refinement chamber entrance to optimize the performance of the apparatus based on specific raw syngas conditions and desired outcomes.

Figure 8:
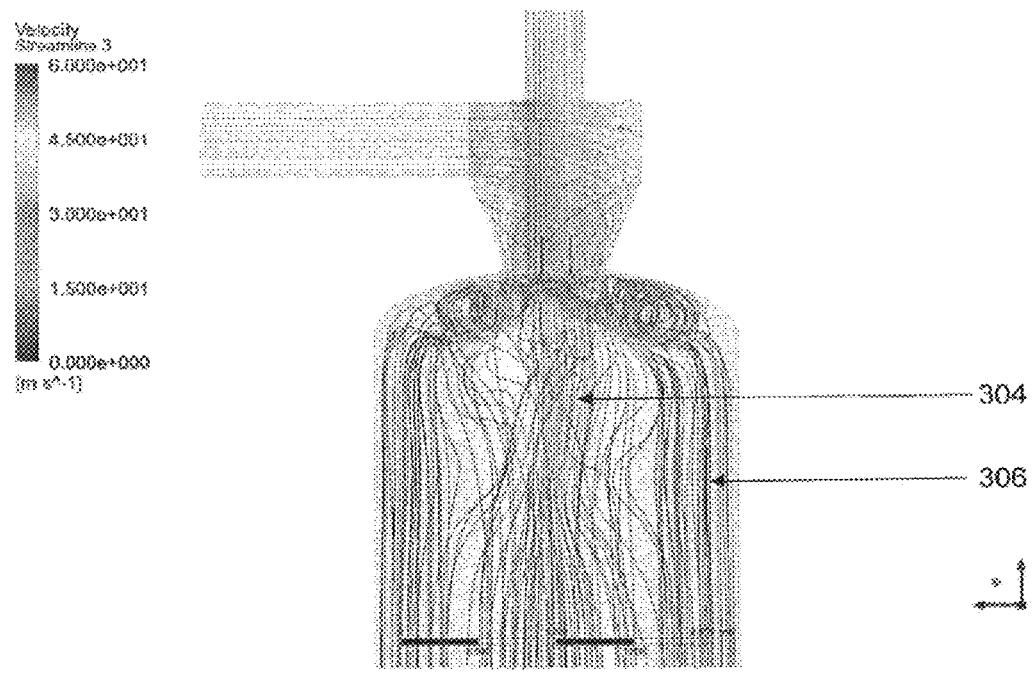
FIG. 8 shows the model results for gas flow streams for the refinement chamber entrance design depicted in FIGS. 7A and 7B. It shows the distinct separation between the core reaction zone/mixing region 304 and the peripheral syngas flow 306.
Figure 9:
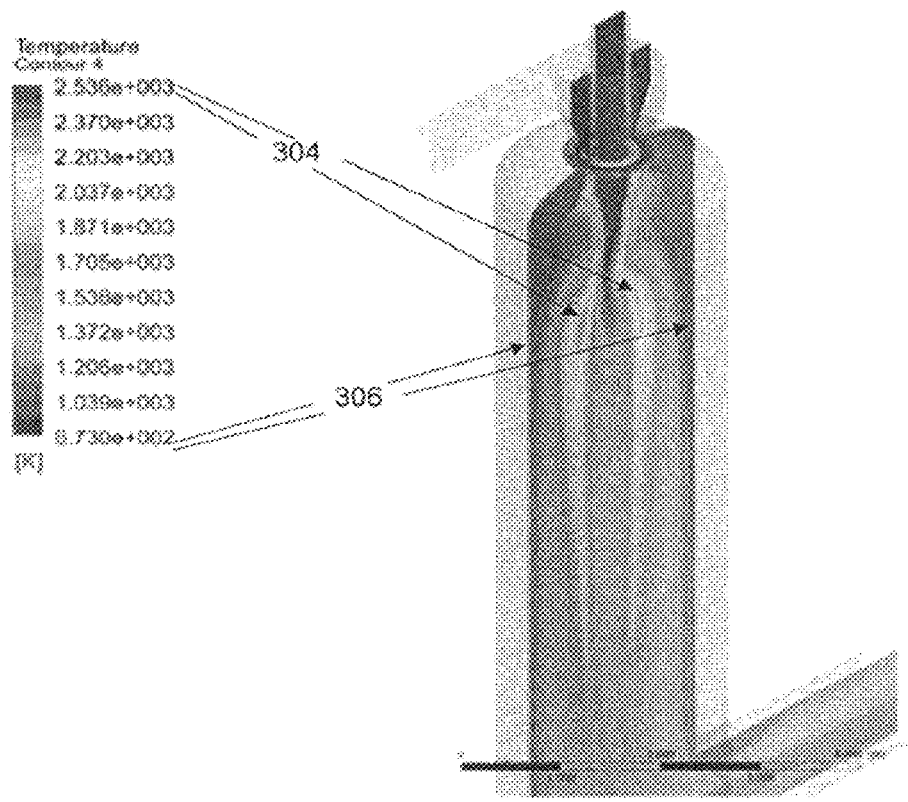
FIG. 9 shows the temperature distribution for the refinement chamber entrance design depicted in FIGS. 7A and 7B. The distinct temperature zones are visible in the picture along with the distinct difference in temperatures between the core reaction zone/mixing region 304 and the peripheral syngas flow 306.

In an alternative embodiment of the invention, air is fed into the reaction chamber vertically down a central axis, while the raw syngas is routed through a raw syngas feed port 309. As a result a swirling flow pattern is induced in the syngas as it enters the reaction chamber. In the reaction chamber the air and swirling syngas come into contact with thermal plasma provided by one or more plasma torches located in the flow path at the entrance to the reactor. The flow streams and temperature for this embodiment are shown in FIGS. 8 and 9.

The design location of plasma entrance into the refinement chamber can be optimized for refinement chamber performance. Plasma entrance geometries can be used to produce different results with reaction chamber performance.

Figure 16:
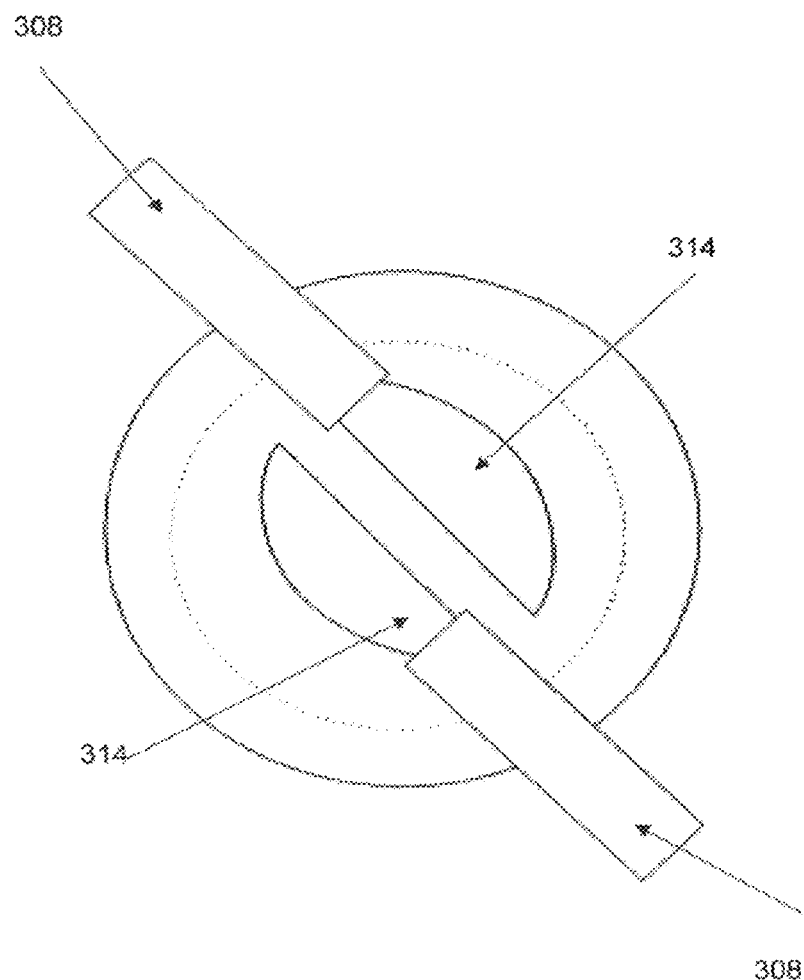
FIG. 16 shows plasma entrances that are located horizontally offset from each other. In the figure the plasma torches 308 and the concentrated plasma 314 are shown.

FIG. 16 shows plasma entrances that are located horizontally offset from each other. In the figure, the plasma torches 308 and the concentrated plasma 314 are shown.

Figure 10:
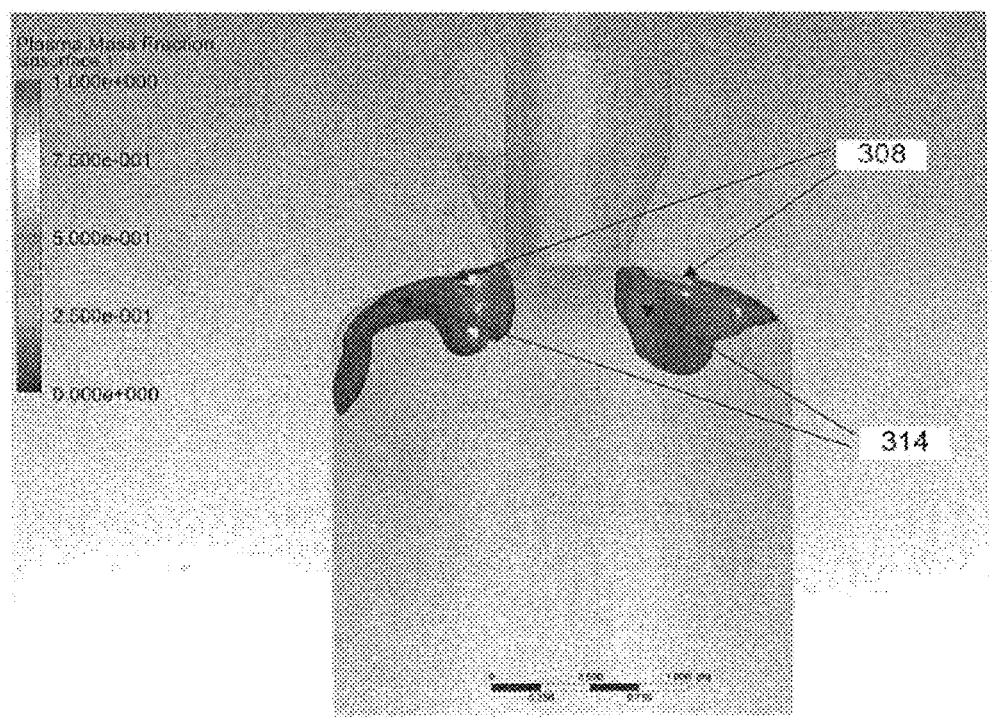
FIG. 10 shows the location of the concentrated plasma 314 in the refinement chamber for the refinement chamber entrance design depicted in FIGS. 7A and 7B. The plasma is injected at the edge of the wall into the gas flow path in this design i.e., the plasma torches are not protruding into the reaction chamber. The plasma torches 308 are located as shown in the figure.
Figure 11:
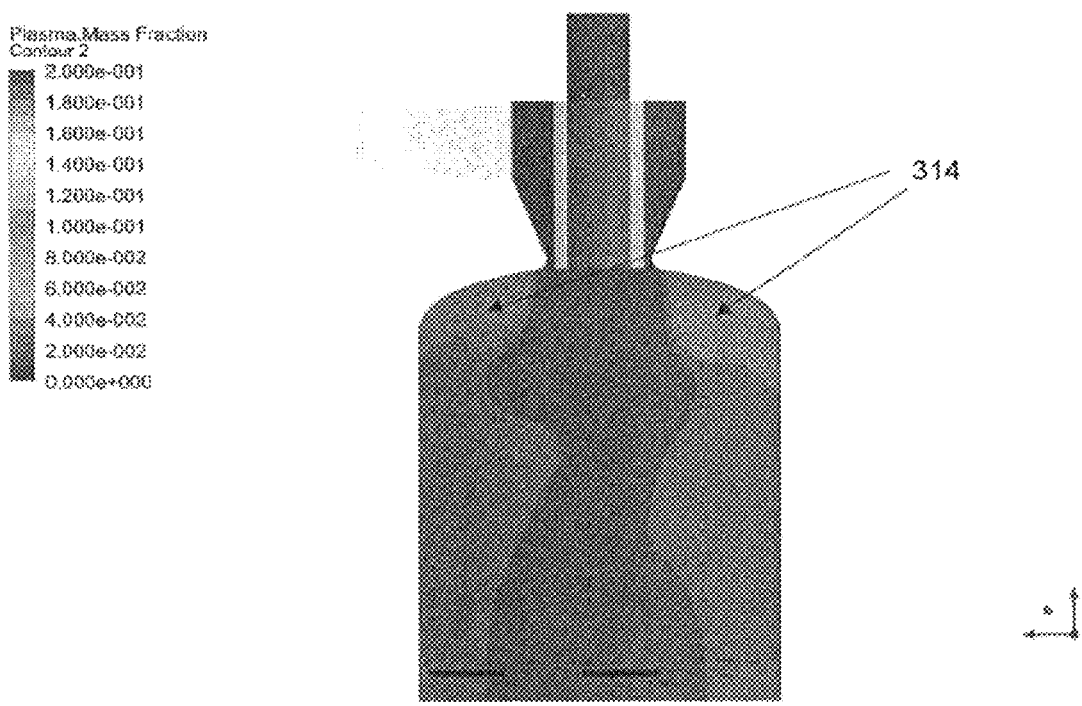
FIG. 11 shows the plasma mass fraction for the embodiment depicted in FIG. 10. The figure shows the distribution of plasma in the gas stream and indicates the location of the concentrated plasma 314.

This embodiment is configured to induce a swirling momentum into the mixture entering the reactor, which results in a well-mixed core reaction zone region of the mixture, thereby enhancing plasma distributions and breaking down tars efficiently. FIG. 10 shows the plasma distribution without a swirling design and FIG. 11 shows it with a swirling reactant mixture.

Figure 12:
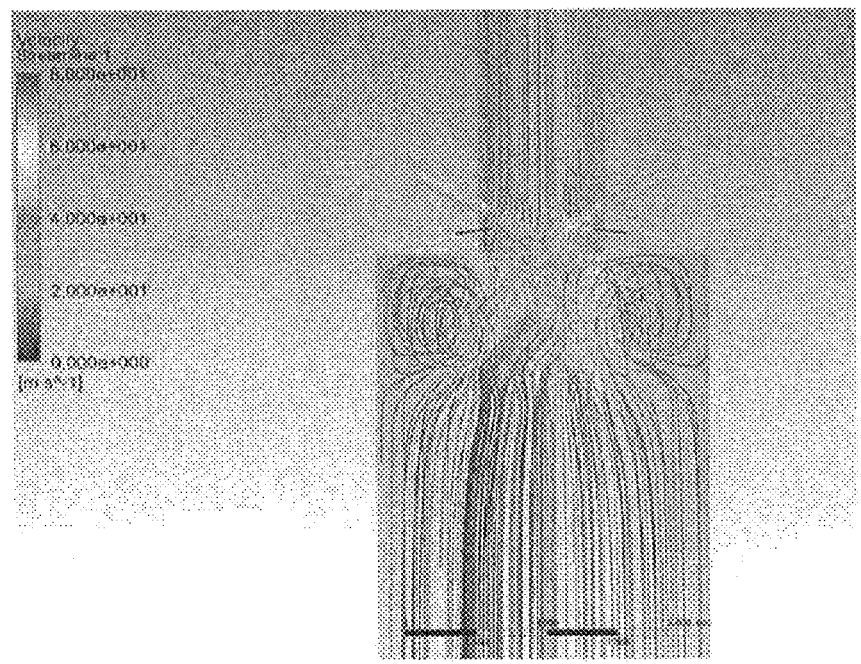
FIG. 12 shows the flow velocities and distribution of the reactant mixture inside the reactor for a simple refinement chamber entrance design, which lacks a frustum shaped entrance portion, in a fourth embodiment.
Figure 13:
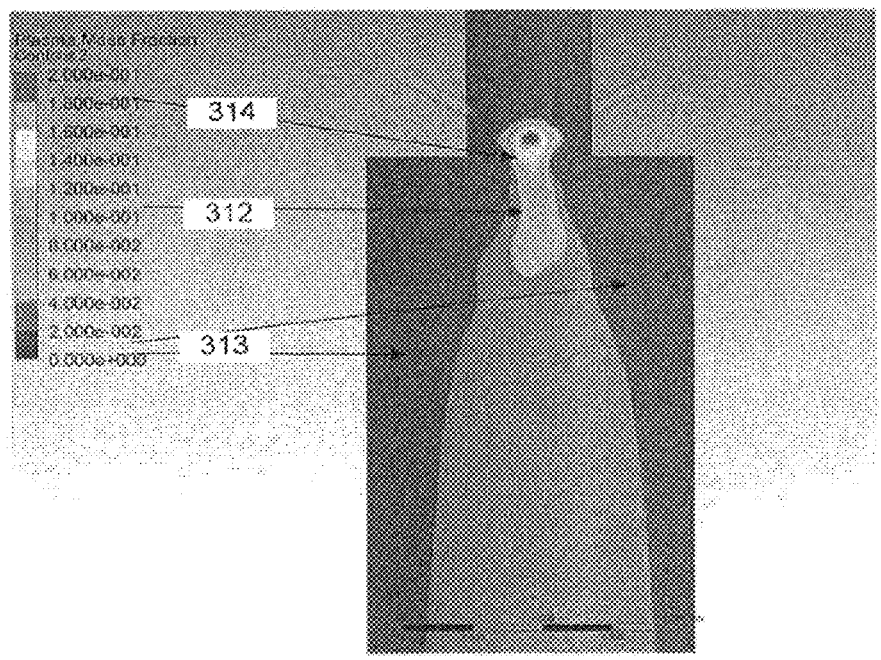
FIG. 13 shows the plasma concentrations associated with operating the design shown in FIG. 12. The drawing shows the location of plasma species present in the mixture within the reactor, using grayscale shading. The concentrated plasma 314, hot region 312 and cold region 313 are seen in the figure.

Alternatively, air input can be via one or more tangential ports. The resultant, modified flow streams and plasma entrainment is shown in FIG. 12 and FIG. 13.

Optionally, the design can be modified by smoothing out the geometrical conditions of the section of the reactor where the reactants enter the reaction chamber.

In various embodiments of the refinement chamber, the raw syngas feed 309 can be split into two or more equal or unequal streams before being fed into the reactor. The number of streams and their respective volumes are a function of the process conditions including, but not limited to inlet temperatures dictated by upstream process conditions, outlet temperatures defined by desired outlet composition, process pressures, feed stock composition, flow rates and the heating value of the stream composition.

In one example of the embodiment the streams were split into a minor stream and a major stream (approximately 25% and 75% volumetric ratios in the test case, to generate a near-stoichiometric or oxidising fuel:air ratio in the core reaction zone of the reactor) before being fed into the central syngas flow zone 302 and the peripheral syngas flow zone 306, respectively. In this general embodiment of the invention, the minor stream can be from 5% to 50% of the main, raw syngas feed 309 stream with the balance being the major stream.

The invention being thus described, it will be apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A plasma-assisted method for treating raw syngas comprising tars, comprising:
    (a) mixing a stream of the raw syngas with air/process additives in a swirling pattern for combustion, with simultaneous injection of plasma-generated radicals, electrons and ions in a central syngas flow zone;
    (b) recirculating a peripheral stream of the raw syngas into a core reaction zone/mixing zone created by combustion of the stream of the raw syngas in the central syngas flow zone; and
    (c) creating a stable flame in a reaction chamber, the reaction chamber comprising a rich fuel:air ratio by igniting a near-stoichiometric or oxidising mixture in the core reaction zone/mixing zone, wherein the raw syngas, the air/process additives, and the plasma-generated radicals, electrons and ions come into contact with each other, concurrently, at an entrance to the reaction chamber.

2. The method of claim 1, wherein the stream of the raw syngas of (a) and the peripheral stream of raw syngas of (b) are equal or unequal volumetric flows.

3. The method of claim 2, wherein the peripheral stream of the raw syngas creates a boundary layer of raw syngas that protects the internal walls of the reaction chamber from high temperatures.

4. The method of claim 3, wherein the boundary layer protects the internal walls of the reaction chamber against corrosion caused by reacting species.

5. The method of claim 3, wherein the air/oxygen is limited in the boundary layer.

6. The method of claim 5, wherein limiting an amount of the air/oxygen in the boundary layer results in lowering temperature in the boundary layer.

7. The method of claim 6, wherein the boundary layer combines with a recirculation zone into the core reaction zone of the reaction chamber.

8. The method of claim 1, wherein the air/process additives are injected axially into the reaction chamber while the raw syngas is injected though a tangential port.

* * * * *